July 25, 1961   F. W. DWYER ET AL   2,993,374
AIR METER

Filed Jan. 16, 1958   2 Sheets-Sheet 1

Inventors
Frank W Dwyer
and John Locke
By Mann, Brown and McWilliams
Attys.

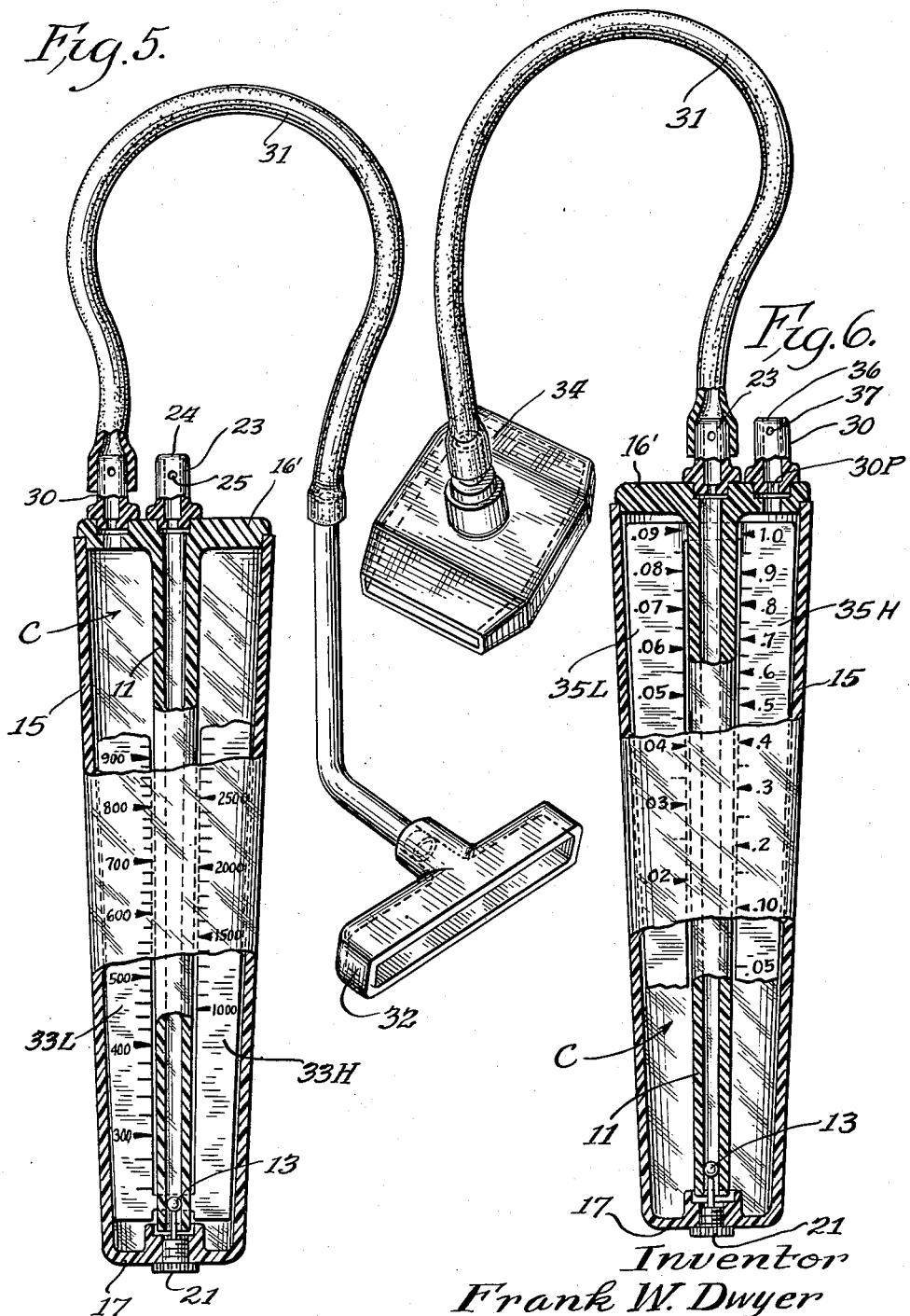

United States Patent Office 2,993,374
Patented July 25, 1961

2,993,374
AIR METER
Frank W. Dwyer, Oak Park, Ill., and John Locke, Michigan City, Ind., assignors to F. W. Dwyer Mfg. Company, a corporation of Illinois
Filed Jan. 16, 1958, Ser. No. 709,258
8 Claims. (Cl. 73—209)

This invention relates to a gauge for measuring the velocity and/or static pressure conditions of air or similar gases and, more particularly, is concerned with providing a highly accurate and economical gauge construction for use, for example, in making wind measurements or in measuring air velocities in heating or air conditioning systems.

The principal object of the present invention is to provide a low-cost, mass-production, pocket-size item of the above type that is accurate and sensitive over a wide range; that is rugged and long lived; and that produces a stable indication.

Other objects and advantages of the invention will become apparent during the course of the following description.

In the accompanying drawings forming a part of this specification and in which like numerals are employed to designate like parts throughout the same;

Figure 1:
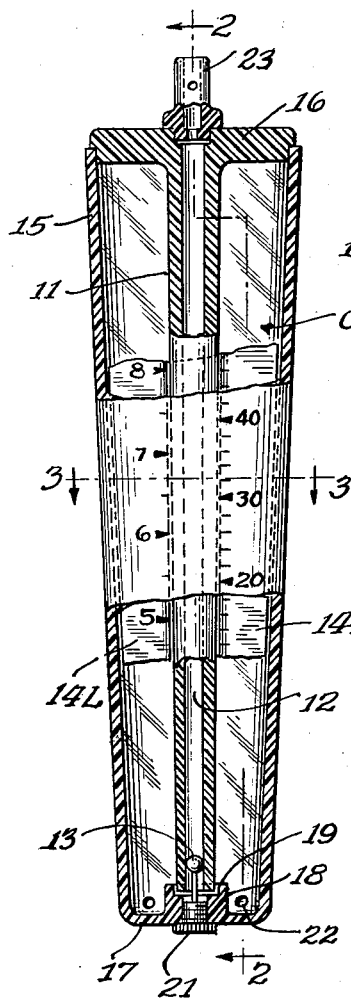
FIG. 1 is a full scale front-elevational view, with parts broken away and sectioned, of an embodiment of the invention that is particularly useful for wind velocity measurements.
Figure 2:
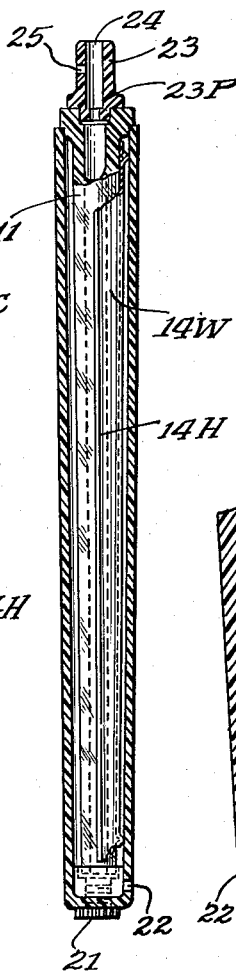
FIG. 2 is a side-sectional view taken on the line 2—2 of FIG. 1.
Figure 3:
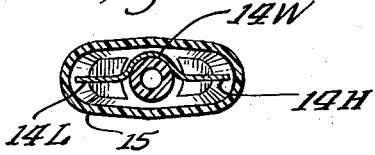
FIG. 3 is a plan sectional view taken on the line 3—3 of FIG. 1.

FIG. 5 is a full scale front-elevational view, with parts broken away and sectioned, of an alternative embodiment of the gauge of the present invention that is shown with a suitable probe for use in measuring air velocities in heating and air conditioning systems; and FIG. 6 is a rear elevational view of the gauge of FIG. 5 shown in connection with a sensing probe for static pressure determinations.

Referring now to the drawings and particularly to FIGS. 1–4 thereof, the gauge of the invention is shown embodied as a wind meter, an important tool for outdoorsmen such as pilots, boating enthusiasts, hunters, and the like. It will be apparent from the full scale representation of FIGS. 1, 2 and 3 that the device is of pocket size, an important feature for the convenience of the user.

For purposes of disclosure the gauge of the invention is shown as including a conventional float tube 11 having an upwardly diverging axial bore 12 through which moves a float 13 for indicating wind speeds in relation to a low-range scale 14L, which, for example, reads from 2 to 10 m.p.h. to an accuracy of ½ m.p.h., and a high-range scale 14H, which, for example, reads from 4 to 66 m.p.h. to an accuracy of 3 m.p.h. The scales 14L and 14H are interconnected by an integral central web 14W that is snugly curved about the float tube 11 to dispose the scales in coplanar relationship at opposite sides thereof.

Figure 4:
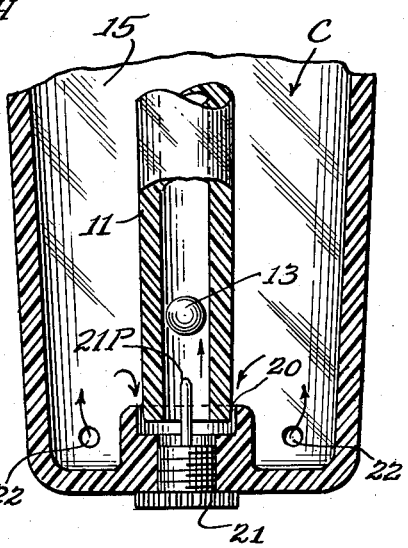
FIG. 4 is an enlarged front-sectional view of the bottom part of the gauge better illustrating the construction and operation thereof.

The float tube 11 is disposed within a casing 15 which is of oblate cylindrical form and diverges upwardly towards the open top end thereof. The tube depends from a top closure plate 16 which, as indicated, is preferably integral therewith, with the closure plate being shouldered for sealing engagement on the upper end of the casing 15. Adhesive or heat fusing techniques are suitable for securing these parts. The casing includes an integral bottom wall 17 formed with an internal boss 18 that carries an upstanding annular shoulder 19 forming a well into which the bottom end of the float tube extends. As best seen in FIG. 4, the well diameter is slightly greater than the external diameter of the bottom end of the float tube to provide an annular air passage 20 through which the air flows to the bottom end of the float tube. To maintain the float 13 in the path of the air stream, a threaded support plug 21 is mounted in the boss 18 and carries a prong 21P for engagement with the float to space it above the bottom wall.

The outer casing 15 and the cooperating top closure plate 16 define an enlarged enclosed preliminary gas chamber C into which air is supplied through one or more inlet ports 22. The ports 22 may be located at any suitable point for feeding into the chamber C, and as shown, it is preferable to locate them in the casing wall on the reverse side of the scales so that the user may face into the wind when taking readings. Pressure builds up in the preliminary chamber C and produces the air flow through the float tube 11 in proportion to the speed of the wind incident on the meter. This arrangement effects a damping and stabilization of the air flow in the float tube and permits a sensitive and accurate indication that is stable and easy to read. The float tube 11 opens through a stub tube 23 having an inlet port 23P of a diameter of approximately .0073″ and being fixedly carried on the closure plate 16 and provided with a pair of outlet orifices 24 and 25. The orifice 24 is in line with the tube passage and may have a diameter on the order of ⅛″ while the orifice 25 extends transversely of the float tube passage and may have a diameter on the order of .025″.

In the illustrated arrangement the low-range scale 14L is correlated with the float for the condition when both orifices are open and the high-range scale 14H is correlated with the float for the condition with only orifice 25 open.

In one constructional embodiment the float 13 is a sphere of expanded polystyrene having a diameter on the order of ⅛″ and weighing approximately 0.7 milligram, and the float passage has a diameter on the order of 0.128″ at its bottom end and tapers at an approximate rate of .010″ per inch. The port holes 22 may have a diameter, for example, on the order of 3/16″. The parts of the casing 15, the closure plate 16, the float tube 11 and stub tube 23 are preferably of a transparent molded plastic material such as methyl methacrylate, while the float support 21 is preferably of machined aluminum, and the scale may either be of sheet metal or paperboard, as desired.

In use the body of the casing 15 is grasped in the palm of the hand with the hand primarily overlying the windward face of the casing, that is, the face which is provided with the ports 22. The orifice 24 will then be readily accessible for selective manual closure by the index finger in order to select the appropriate scale.

In FIGS. 5 and 6, the device is shown embodied as a draft gauge and in general is constructed identically with the corresponding arrangement described in connection with FIGS. 1 and 4, except that the ports 22 are eliminated and the incoming gas is introduced through a stub tube 30 carried on a closure plate 16' having an opening establishing communication between the tube 30 and the chamber C.

In the case of the FIG. 5 arrangement, the stub tube 30 is shown connected through a flexible hose 31 to a chambered collector probe 32 such as is employed in taking velocity measurements of the air emerging from a supply grill of a heating or air conditioning system. In this case the scales are calibrated in terms of feet per minute, with the low-range scale 33L ranging from 260 to 1,200 feet per minute and the high-range scale 33H ranging from 1,000 to 4,000 feet per minute. The stub tube 23 at the outlet of the float tube 11 is again provided with a similar set of orifices 24 and 25, and the low-range scale 33L corresponds to the condition where both orifices are open and the high-range scale 33H corresponds to the condition where only orifice 25 is open.

As shown in FIG. 6, this draft gauge structure is readily adapted for use in making static pressure measurements such, for example, as are commonly made at the face of an air-return grill in a heating or air conditioning system; and for such use the outlet stub tube 23 is connected through a hose 31 to a return-grill sensing probe 34 adapted for sensing the static pressure at the face of a return grill. With this setup also, it will be apparent that the atmospheric pressure at the inlet stub 30 will predominate and produce an upward flow of air through the float tube 11. A separate pair of scales, 35L for low-range and 35H for high-range, are provided and are arranged in back-to-back relation with the previously mentioned scales 33H and 33L, respectively. The low-range scale 35L reads from 0" to .09" of water, and the high-range scale 35H reads from .05" to 1.0" of water. The stub tube 30 has an in-line inlet orifice 36 adapted for selective closing by the user's index finger and a transverse orifice 37, and the high-range scale is selected by closing off orifice 36 while the low-range scale 35L is selected by leaving both orifices open. The bottom end of the stub tube communicates through a port 30P having a diameter on the order of .073", while the orifice 36 may have a diameter of ⅛", with orifice 37 having a diameter on the order of $\frac{1}{32}$".

It will be apparent that in either of the applications illustrated in FIGS. 5 and 6, the flexible tube 31 is mounted on the projecting tube so as to overlap and close off the transverse orifice of such tube. The device of FIGS. 5 and 6 functions in an identical manner as respects the action of the float 13 within the float tube 11, and the preliminary chamber C again functions to provide the same advantages of stability and more accurate results.

It should be understood that the description of the preferred form of the invention is for the purpose of complying with Section 112, Title 35, of the U.S. Code and that the claims should be construed as broadly as prior art will permit.

We claim:

1. In a gauge with one orifice open to atmosphere and of the type in which a float is mounted in a transparent vertical tube having an open top providing an outlet for gas moving upwardly through the tube, a gauge body comprising a hollow casing member having a bottom closure wall and being open at the top, an end closure member for the top of said casing and defining therewith a permanent enclosed preliminary gas pressure stabilization chamber extending for the length of the casing, and being of fixed volume, and a float tube stationarily fixed to and depending from said closure member to project through said permanent chamber, said tube having top and bottom openings with the top opening extending through said closure member and with the bottom opening in series communication with said preliminary gas pressure stabilization chamber, one of said members having an open ended passage forming a gas inlet port from atmosphere directly to said preliminary gas pressure stabilization chamber.

2. The arrangement of claim 1 wherein said bottom wall carries an upstanding annular shoulder forming a well at the bottom of said preliminary chamber for receiving the bottom of said tube in loose relation therein to establish communication between said tube and said chamber.

3. A gauge of the class described comprising a plate member a float tube depending from said plate member and rigid therewith and having a tapered axial bore diverging upwardly and opening through said plate member, a float within the tube, and a hollow casing member having an open top for insertion of said tube and cooperating with said plate member to provide an enclosed preliminary gas pressure stabilization chamber alongside said tube, said casing having a bottom wall provided with an upstanding annular shoulder that forms a well for receiving the lower end of said tube, the internal diameter of said shoulder being slightly greater than the external diameter of the lower end of said tube to provide an annular passage through which said preliminary gas pressure stabilization chamber is in series communication with said tube, one of said members having an open ended passage forming a gas inlet port from atmosphere to said chamber.

4. The gauge of claim 3 wherein said bottom wall carries a prong projecting upwardly through said well to support said float in the bottom of said tube in spaced relation to the bottom of said tube.

5. The gauge of claim 3 wherein said tube is provided with an orifice tube having first and second outlet orifices therein and said gauge is provided with indicia providing two scales of different ranges, each extending substantially the entire height of the gauge, one scale being low range and being correlated with the float with both orifices open and the other scale being high range and being correlated with the float with one orifice closed and one open.

6. A gauge as set forth in claim 3 wherein the gas inlet port for said pressure stabilization chamber includes a first and second inlet orifice and said gauge is provided with indicia providing two scales of different ranges each extending substantially the entire height of the gauge, one scale being low range and correlated with the float with both inlet orifices open and the other scale being high range and correlated with the float with one inlet orifice closed and one open.

7. In combination in a gas gauge of a type in which a float is mounted in an open ended transparent vertical tube having an upwardly diverging bore and having an open top providing an outlet for gas moving upwardly through the tube, said tube terminating at its upper end in an orifice stub having first and second outlet orifices for the discharge of gas moving upwardly in said bore, a gauge body having said tube integrated therein and including hollow casing structure stationarily fixed to said tube, said tube and casing structure bordering and jointly defining a permanent enclosed preliminary gas pressure stabilization chamber of fixed volume, said chamber extending substantially the entire height of said tube and communicating with said tube at the bottom end thereof, said casing structure having a gas inlet port to said pressure stabilization chamber, and indicia on said gauge defining a low range scale and a high range scale each of which extends substantially the entire height of the gauge, and said low range scale being correlated with the float with both said outlet orifices open and said high range scale being correlated with the same float with one outlet orifice closed and one open.

8. In combination in a gas gauge of a type in which a float is mounted in an open ended transparent vertical tube having an upwardly diverging bore and having an open top providing an outlet for gas moving upwardly through the tube, a gauge body having said tube integrated therein and including hollow casing structure stationarily fixed to said tube, said tube and casing structure bordering and jointly defining a permanent enclosed preliminary gas pressure stabilization chamber of fixed volume, said chamber extending substantially the entire height of said tube and communicating with said tube at the bottom end thereof, and said casing structure having a gas inlet port to said pressure stabilization chamber.

References Cited in the file of this patent

UNITED STATES PATENTS

| | | |
|---|---|---|
| 2,258,023 | McKernon | Oct. 7, 1941 |
| 2,475,630 | Melas et al. | July 12, 1949 |
| 2,779,194 | Slettenmark | Jan. 29, 1957 |
| 2,861,451 | Emmons | Nov. 25, 1958 |

FOREIGN PATENTS

| | | |
|---|---|---|
| 773,905 | Great Britain | July 20, 1955 |

UNITED STATES PATENT OFFICE

CERTIFICATE OF CORRECTION

Patent No. 2,993,374                                                           July 25, 1961

Frank W. Dwyer et al.

It is hereby certified that error appears in the above numbered patent requiring correction and that the said Letters Patent should read as corrected below.

Column 6, line 9, for the Great Britain reference "773,905" read -- 733,905 --.

Signed and sealed this 28th day of November 1961.

(SEAL)
Attest:

ERNEST W. SWIDER                                         DAVID L. LADD
Attesting Officer                                           Commissioner of Patents